United States Patent [19]

Rinaldi

[11] 4,363,954

[45] Dec. 14, 1982

[54] DEVICE FOR THE BACK SUPPORT OF THE FIRST RUN WELD POOL IN THE AUTOMATIC BUTT-WELDING OF PIPES

[75] Inventor: Fernando Rinaldi, Guardamiglio, Italy

[73] Assignee: Saipem, S.p.A., Milan, Italy

[21] Appl. No.: 213,659

[22] Filed: Dec. 5, 1980

[30] Foreign Application Priority Data

Jan. 24, 1980 [IT] Italy .............................. 19413 A/80

[51] Int. Cl.³ ............................................ B23K 9/32
[52] U.S. Cl. .................................... 219/160; 228/50; 228/216
[58] Field of Search ................... 219/160; 228/50, 216

[56] References Cited

U.S. PATENT DOCUMENTS 2,430,266 11/1947 Zimmerman et al. ................ 228/50
3,229,884 1/1960 Franklin ............................. 228/50

Primary Examiner—Elliot A. Goldberg
Attorney, Agent, or Firm—Morgan, Finnegan, Pine, Foley & Lee

[57] ABSTRACT

A device for the back support of the first run weld in the automatic butt-welding of two pipes held together by the two circumferential facing sets of radial pistons of an internal connection. The connector includes a set of independent copper pads of trapezoidal shape disposed in the form of a ring and fixed, with their bases alternately inverted, on a corresponding underlying set of pad support elements idly supported by respective horizontal pins rigid with support blocks which are resiliently supported by one of said circumferential sets of radial pistons of said internal connector by means of radial thrust springs. The pads are kept resiliently and constantly pressed against each other in the manner of a ring along their inclined sides by respective horizontal thrust springs supported by said horizontal pins and acting alternately on opposite faces of said pad support elements. The trapezoidal copper pads are fixed to the respective pad support elements by screws which are inserted into the width of their bases.

3 Claims, 4 Drawing Figures

DEVICE FOR THE BACK SUPPORT OF THE FIRST RUN WELD POOL IN THE AUTOMATIC BUTT-WELDING OF PIPES

This invention relates to a device which provides an effective back support for the first run weld pool in the automatic butt welding of two pipes, and more particularly a device comprising independent copper pads which are self-positioning both horizontally and radially for adapting themselves perfectly to the inner circumference of pipes of different diameters without any gap between the contact surfaces of the pads.

It is well known that when carrying out the first run or full penetration root bead from the outside in the automatic butt-welding of two pipes, it is necessary to use a back support device disposed in the pipes to be butt-welded at the contacting edges of the welding bevel to support the weld pool which would otherwise fall into the pipes as soon as said thin contacting steel edges melt during the first run.

The back support device generally is fitted to the internal connector used for holding the two pipes to be welded together in an abutting position to ensure that the device is perfectly centered and rests on the edges of the welding bevel.

In the present state of the art, two different types of devices are known. The first type includes a ring composed of independent copper portions which have a length of one quarter or one half of the circumference and which are moved radially until they rest on the inner circumference of the pipes to be butt-welded by radial thrust systems of various types that are supported by the internal connector. However this known device has a series of drawbacks, the main one of which is the fact that the ring portions are in contact with each other only for one determined size of circumference, which is not always the same as the inner circumference of the pipes to be welded. Thus when they are moved radially so that they match the inner circumference of the pipes, they withdraw from each other to create apertures, slots or gaps between their facing edges and no longer fully support the weld pool.

A further drawback of this known device is the fact that the independent copper portions are too long to be able to effectively match the inner circumference of the pipes to be welded, especially when the circumference is more or less oval.

Finally, a further drawback is due to complications in construction caused by the installation of the internal connector of a radial thrust system for the ring portions. All the aforesaid drawbacks are practically obviated in the second type of a known device, which uses the actual radial pistons of the internal connector for the radial movement, and which can match a greater number of different circumferences without creating apertures or gaps.

More specifically, this known device has a set of substantially rectangular independent copper pads which are disposed side-by-side in the form of a ring along their inclined widths, and which are screwed on to a corresponding underlying set of pad supports. In turn, the supports are resiliently supported by radial pistons of the internal connector by radial thrust springs.

In this manner, the radial movement of the pistons of the internal connector in cooperation with the action of said radial thrust springs causes the pads to press resiliently against the inner surface of the pipes to be welded, and the pads are able to adapt their circumference to the inner circumference of the pipes by suitably sliding relative to each other in the radial direction along their inclined contacting widths, against the action of their radial thrust springs. This causes the circumference of the pads to reduce or enlarge without giving rise to apertures or gaps because their inclined edges always remain in contact with each other.

However, this second type of device also has its drawbacks. It has been found that the radial sliding between the pads in adapting to the inner circumference of the pipes to be welded gives rise to steps between adjacent pads, and thus cavities are formed which cause welding defects. In addition, the outer surface of the ring formed by the pads contains the heads of the screws which fix the pads to the respective underlying pad supports, and this considerably restricts the useful annular face on which the weld pool can rest. Finally, it is apparent that in order not to create dangerous apertures or gaps, the radial sliding between the pads must be limited to the pad thickness, which must not be too great. As a consequence the device only can adapt itself to a limited range of circumferences.

The object of the present invention is to obviate these drawbacks by providing a new device for the back support of the first run weld pool which is applicable to a wide range of circumferences, which perfectly matches the inner surface of the pipes to be welded without creating apertures, gaps, steps or cavities, and which presents a large useful support face for the weld pool.

This object is attained by the device of the present invention which includes a set of independent copper pads of trapezoidal shape which have their bases alternately inverted on to pad support elements idly supported by horizontal pins fixed to support blocks resiliently supported by the radial pistons of the internal connector. The pads are kept resiliently and constantly pressed against each other in the manner of a ring along their inclined sides by horizontal thrust springs supported by the horizontal pins which alternately act on opposing faces of the pad support elements.

In this manner, the pads can move radially and horizontally, and because of the effect of said radial and horizontal thrust springs they are self-positioning in the horizontal and radial directions, and can easily match different circumferences, even oval shapes, without creating gaps or steps between the contacting surfaces of the pads. This is because as the independent copper pads move horizontally relative to each other by sliding along their inclined sides, as is allowed by the respective horizontal thrust springs, they vary the circumference of the ring. Moreover, the inclination and length of said inclined contacting sides of the pads allows a large sliding range and thus a large variation in said ring circumference, which enables the ring to adapt to pipes, the diameters of which differ even by $\pm 1''$.

In addition, the continuous action of the horizontal thrust springs ensures continuous contact between the various pads, so that neither gaps nor steps can form therebetween.

Finally, as the pad supports and thus the pads themselves are idly mounted on horizontal pins and can therefore rotate about the axis of said pins, it is apparent that the various independent pads can easily adapt to more or less oval circumferences of pipes to be butt-welded.

Summarising, the device according to the present invention for the back support of the first run weld pool in the automatic butt-welding of two pipes held together by the action of two facing circumferential sets of radial pistons of an internal connector, wherein the device comprises a set of independent copper pads disposed in the form of a ring and fixed respectively to a corresponding underlying set of pad support elements which are resiliently supported by one of said circumferential sets of radial pistons of internal connector by means of radial thrust springs, and wherein the independent copper pads are of trapezoidal shape, are fixed with their bases alternately inverted on to pad support elements idly supported by horizontal pins rigid with support blocks resiliently supported by one of said circumferential sets of radial pistons of the internal connector by means of said radial thrust springs, and are held resiliently and constantly pressed against each other in the manner of a ring along their inclined sides by respective horizontal thrust springs supported by the horizontal pins and acting alternately on opposing faces of said pad support elements.

According to a further characteristic of the present invention, the trapezoidal copper pads are fixed to the respective pad support elements by screws which are inserted into the width or side of their bases.

In this manner, the useful annular face for supporting the first run weld pool is very wide, because it is not restricted by the presence of metal elements (screws).

The following is a detailed description together with accompanying drawings of the preferred embodiment of the invention. It is to be understood that the invention is capable of modification and variation apparent to those skilled in the art within the spirit and scope of the invention.

Figure 1:
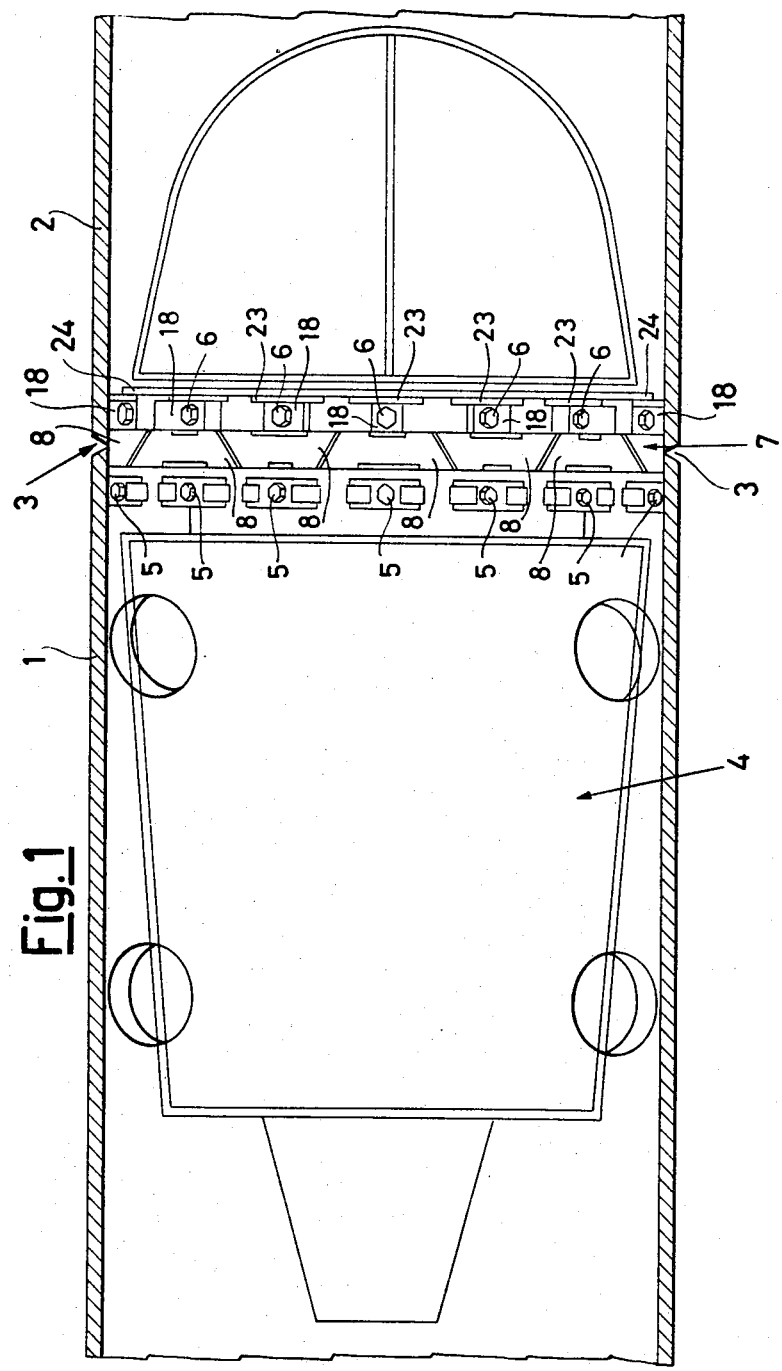
FIG. 1 is a diagrammatic longitudinal view, partly in section, of two pipes to be butt-welded, which are held together by an internal connector on which the device for the back support of the weld pool according to the invention is mounted.

With reference to the figures, and first to FIG. 1, there is shown two pipes 1 and 2 to be butt-welded together at the circumferential weld bevel 3, and the internal connector 4 provided with two facing circumferential sets of radial pistons 5 and 6, which when pressed radially against the inner surfaces of the pipe 1 and pipe 2, keep the pipes 1 and 2 centred and held together during the welding operation. In order to prevent the first run weld pool from falling into the pipes, a device 7 for the back support of the pool is fitted between the pipes 1 and 2 at the contacting edges of the weld bevel 3.

Figure 2:
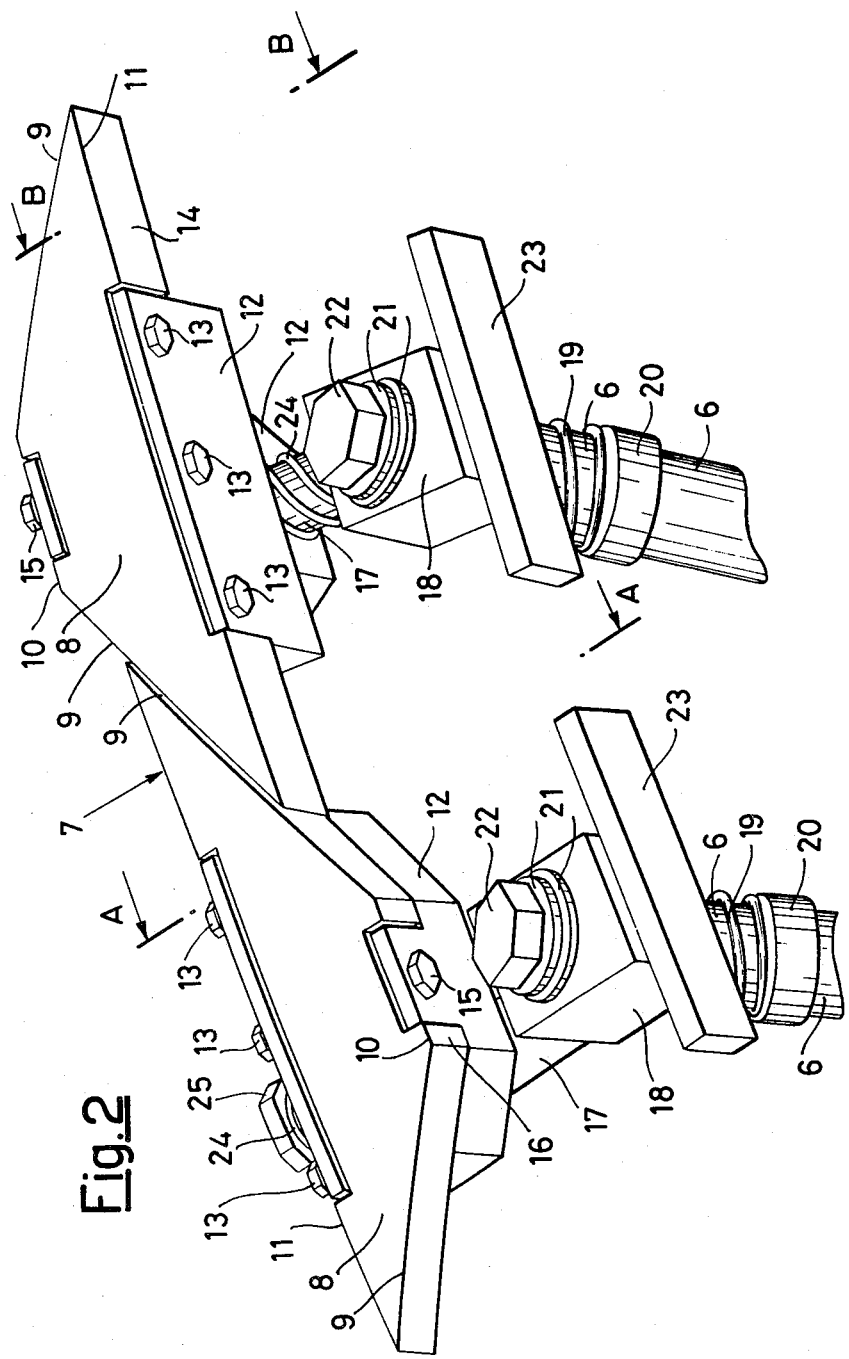
FIG. 2 is an enlarged isometric view of two adjacent components of the device for the back support of the weld pool according to the invention.

As shown in FIGS. 1 and 2 device 7 according to the present invention has a set of independent copper pads 8 of trapezoidal shape, which are disposed side-by-side along their inclined sides 9 in order to form a ring. The pads also are disposed with their bases 10 and 11 alternately inverted such that the minor base 10 of one pad is adjacent to the major bases 11 of the two adjacent pads and vice versa.

More specifically, each trapezoidal copper pad 8 is mounted on an underlying pad support element 12 by the screws 13 which are inserted into the width or side 14 of the major base 11 of the pad 8, and by the screw 15 inserted into the width or side 16 of the minor base 10 of the pad 8 (see FIG. 2 specifically). In this manner, the outer annular face of the ring formed by the pads 8 is entirely available for supporting the first run weld pool, because it is not limited by the presence of metal fixing elements.

The pad support element 12, in turn, is supported idly by a horizontal pin 17 rigidly fixed to a support block 18 in a vertical bore in which there is inserted a radial piston 6 of one of the two sets. The support block 18 is urged radially outwards by a radial thrust spring 19 which acts between the lower face of the block 18 and an enlargement 20 on the piston 6. The spring 19 is prevented from escaping from the radial piston 6 by shoulder and spacing washers 21 fixed to the head of the radial piston 6 by a coupling bolt 22. On the face of the support block 18 opposite to that carrying the horizontal pin 17, there is a stop plate 23 fixed thereto which cooperates with a stop ring 24 of the internal connector 4. The plate 23 rests against the ring 24 to prevent rotation of the support block 18 about the axis of the radial piston 6 so that the support block 18 can only move radially.

Figure 3:
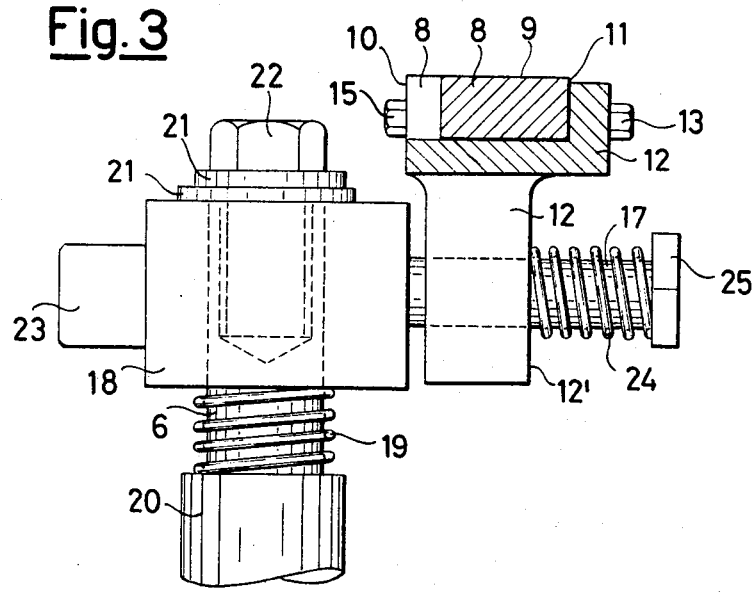
FIG. 3 is a side view on the line AA of FIG. 2.
Figure 4:
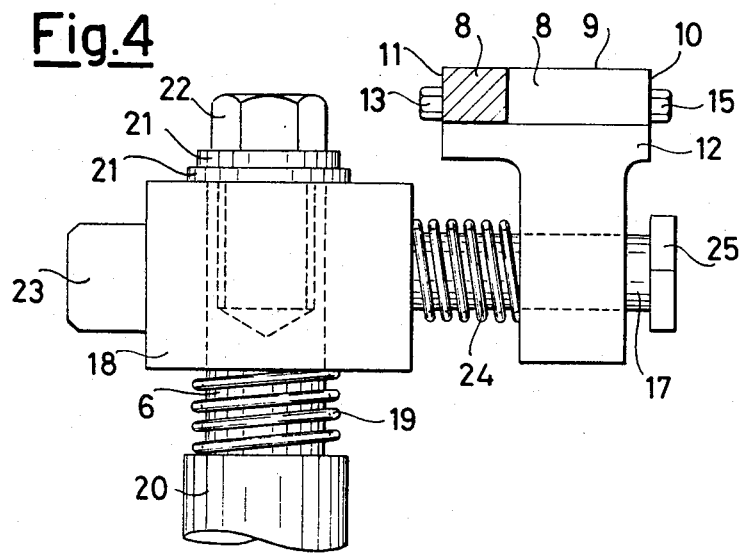
FIG. 4 is a side view on the line BB of FIG. 2.

Finally, the pad support element 12 is sized so that the relative trapezoidal pad 8 projects radially relative to the head of said coupling bolt 22 (see FIGS. 2-4), and the trapezoidal copper pads 8 are kept resiliently and constantly pressed against each other along their inclined sides 9 by horizontal thrust springs 24 which are supported by the horizontal pins 17 and are made to alternately act on opposing faces of the pad support elements 12. More specifically, a spring 24 is disposed between the outer face 12' of a pad support 12 (see FIG. 3) and a locking nut 25 screwed on to the free end of the horizontal pin 17, whereas in the case of the adjacent pad the spring 24 is disposed between the opposing faces of the support block 18 and of the adjacent pad support 12 (see FIG. 4).

The device operates as follows: As the circumferential set of radial pistons 6 of the internal connector 4 is moved radially in order to lock the pipe 2, it also radially moves the set of trapezoidal copper pads 8, which come into contact with the inner surface of the pipe 2 before the pistons. As the pistons 6 are further moved radially in order to cause their heads 22 to press against the inner surface, the pads 8 are resiliently pressed against the inner surface due to the compression of the relative radial thrust springs 19, and slide horizontally along their inclined contacting sides 9 due to the compression of their horizontal thrust springs 24, so that their ring matches the circumference of said inner surface. Inasmuch as the pad supports 12 and pads 8 are idly mounted on the horizontal pins 17, moreover, they can rotate about the axes of said pins so that the pads 8 can adapt even to inner surfaces of oval shapes without creating gaps or steps at their inclined contacting sides 9.

Finally, because the trapezoidal pads are independent and self-positioning both in the horizontal and radial directions, they are able to perfectly describe circumferences which are oval and/or different in diameter by ±1".

The invention in its broader aspect is not limited to the specific described embodiment and departures may be made therefrom within the scope of the accompanying claims without departing from the principles of the invention and without sacrificing its chief advantages.

I claim:

1. A device for the back support of the first run weld pool in the automatic butt-welding of two pipes held together by the action of two facing circumferential sets of radial pistons of an internal connector, comprising:

a set of independent copper pads disposed in the form of a ring, wherein said pads are of trapezoidal shape arranged with their bases alternately inverted, a set of support elements underlying and corresponding to said pads and onto which said pads are mounted, support blocks resiliently supported by the set of radial pistons of said internal connector by radial thrust springs, horizontal pins fixed to said support blocks which also idly support said elements and pads and thereby interconnect said pads and elements to said pistons and radial thrust springs, and horizontal thrust springs supported by said horizontal pins which alternately act on opposing faces of said support elements to resiliently and constantly press said pads against each other along their inclined surfaces, to thereby provide a back support without gaps or spaces.

2. A device as claimed in claim 1, wherein said trapezoidal copper pads are fixed to the respective pad support elements by screws which are inserted into the width of their bases.

3. An improved device as claimed in claim 1, wherein said pads rotate about their horizontal pins to adapt to different inner faces of said pipes without creating gaps or steps at the inclined contacting sides of said pads.

* * * * *